United States Patent [19]

Munnion

[11] Patent Number: 4,605,296

[45] Date of Patent: Aug. 12, 1986

[54] MOUNTING ARRANGEMENT FOR A CAMERA VIEWFINDER

[75] Inventor: Derek Munnion, Andover, England

[73] Assignee: Link Electronics Limited, Great Britain

[21] Appl. No.: 530,988

[22] Filed: Sep. 9, 1983

[30] Foreign Application Priority Data

Sep. 9, 1982 [GB] United Kingdom ............... 8225699

[51] Int. Cl.⁴ ............................................. G03B 13/02
[52] U.S. Cl. ..................................... 354/223; 358/224
[58] Field of Search ............... 354/219, 223; 358/224, 358/229

[56] References Cited

U.S. PATENT DOCUMENTS

| | | | |
|---|---|---|---|
| 1,800,225 | 4/1931 | Mitchell | 354/223 |
| 2,285,456 | 6/1942 | Nowland | 354/223 |
| 3,845,238 | 10/1974 | Schneider et al. | 358/229 |
| 4,375,653 | 3/1983 | Staley | 358/229 |
| 4,389,675 | 6/1983 | Suzuki et al. | 358/229 |
| 4,408,860 | 10/1983 | Barzee | 354/293 |
| 4,409,619 | 10/1983 | Takubo et al. | 354/224 |

Primary Examiner—A. A. Mathews
Attorney, Agent, or Firm—Remy J. VanOphem

[57] ABSTRACT

A mounting arrangement for adjustably attaching a viewfinder to a camera having at least one rocker, the rocker having a curved surface which permits a rocking motion between the viewfinder and the camera. Preferably, the mounting arrangement includes an attachment device for attaching the rocker to the surface over which the rocker is capable of moving. The attachment device may include a flexible elongate member which is secured adjacent one end of the rocker and also secured adjacent the opposite end of the surface over which the rocker is capable of moving.

17 Claims, 5 Drawing Figures

MOUNTING ARRANGEMENT FOR A CAMERA VIEWFINDER

BACKGROUND OF THE INVENTION

1. Field of Invention

The present invention relates to a mounting arrangement for a camera viewfinder and is particularly applicable to the mounting of a viewfinder of a television broadcast camera.

2. Description of Prior Art

In many filming conditions it is necessary for the camera to be capable of a wide range of movements. It is a common requirement for a camera, such as a television broadcast camera, to be adjustable in height from near ground level up to 12 feet from the ground and to be capable of plus or minus 60% of inclination. Such requirements present difficulties in providing a viewfinder which can be positioned by the camera operator so as to enable a reasonable working stance, especially when the camera nears the extremes of its movements. It will be appreciated that the viewfinder has a viewing screen onto which the image seen by the camera is projected independently of the permitted relative movement between the viewfinder and the camera.

Conventionally, the mounting arrangement for the viewfinder has consisted of simple linkages interconnecting the viewfinder and the camera. The linkages have held the viewfinder at a relatively large separation from the point of attachment to the camera, thus enabling movement of the viewfinder along a relatively large arc. Pivotal connection is provided between the linkages and the viewfinder so that the viewfinder can be suitably positioned even when the camera is inclined at large angles.

The conventional mounting arrangements are ungainly. The large degree of permissible movement and the often large separation of the viewfinder from the camera result in drastic variations in the position of the center of gravity of the combined camera and viewfinder and serious problems in balancing the camera result. In known mounting arrangements, the distance between the viewfinder and the camera is often such that it becomes necessary to provide special positions and locking arrangements to prevent damage to the mounting during transport of the camera.

SUMMARY OF THE INVENTION

With a view to mitigating the above disadvantages, the present invention provides a mounting arrangement for adjustably attaching a viewfinder to a camera the mounting arrangement has at least one rocker with a curved surface which permits a rocking motion between the viewfinder and the camera.

Preferably, the mounting arrangement includes attachment means, for attaching the rocker to the surface over which it is capable of moving, in the form of a flexible elongated member which is secured adjacent one end of the rocker and also secured adjacent the opposite end of the surface over which the rocker is capable of moving.

An advantageous configuration of the rocker results when the curved surface forms part of the perimeter of an ellipse.

BRIEF DESCRIPTION OF THE DRAWINGS

An embodiment of the present invention will now be described by way of example only and with reference to the accompanying drawings, in which.

DESCRIPTION OF THE PREFERRED EMBODIMENT

Figure 1:
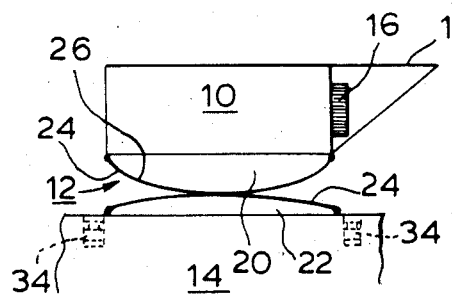
FIG. 1 represents a simplified vertical section through the viewfinder, the mounting arrangement and part of the camera.

A simplified vertical section of the viewfinder 10, mounting arrangement 12 and part of a camera 14 is shown in FIG. 1. The viewfinder 10 has a viewing screen 16 partially surrounded by a hood 18 onto which the image seen by the camera is projected. Projection of the camera image to the viewfinder viewing screen 16 is independent of angular displacements between the viewfinder 10 and the camera 14. The viewfinder 10 is attached to the camera 14 by the mounting arrangement 12. The mounting arrangement 12 includes a pair of parallel spaced-apart rockers 20 which are attached to the viewfinder 10.

Attachment means in the form of cables 24 prevent separation of the rockers 20 from the rocker support 22. The cables 24 are secured at respective ends of the rockers 20 and pass along the operational surface thereof so as to contact the corresponding rocker support 22. The cables 24 then pass in their respective directions along the rocker supports 22 and are secured adjacent the ends thereof. Each cable 24 is secured at one end of a rocker 20 and the other end of each cable is secured at the end of the corresponding rocker support 22 opposite the end of the rocker 20 at which the cable is secured. The cables 24 are tensioned by means of respective tension drums 34 at one or both ends of the cables. The rocker supports 22 have an arcuate longitudinal profile which act as guides for the cables 24 and thereby reduce the tension required within the cables 24 themselves in order to retain the viewfinder 10 on the camera 14 with sufficient security.

The rockers 20 each have a curved surface 26 which permits a rocking motion between the viewfinder 10 and the camera 14. The cables 24 pass along the surfaces 26 between the rockers 20 and rocker supports 22. Due to the arcuately curved surface 26 of the rocker 20 and the arcuate profile of the rockers supports 22, the cables 24 cross each other along the length of the mounting arrangement 12 and, in effect, form a rolling pivot between the rocker 20 and the corresponding rockers supports 22. As the viewfinder 10 is tilted with respect to the camera 14, the rolling pivots formed by the cables 24 move along the length of the mounting arrangement 12.

The curved surfaces 26 of the rockers 20 follow the perimeter of an ellipse and this configuration is found to be particularly beneficial for rocking of the viewfinder 10 with respect to the camera 14 and also for more extreme displacements between the viewfinder 10 and the camera 14, as will be described.

Figure 2:
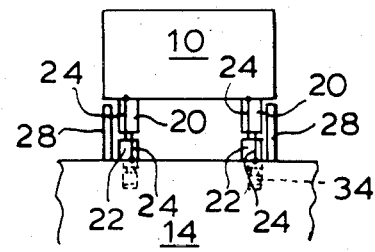
FIG. 2 shows the viewfinder, mounting arrangement, and part of the camera as seen from the front of the camera.

FIG. 2 shows the viewfinder 10 and mounting arrangement 12 as seen from the front of the camera 14. FIG. 2 shows that the rockers 20 are restrained between a pair of longitudinal guides 28 secured to the camera 14. The rocker supports 22 are located between the guides 28. The guides 28 prevent lateral displacement of the viewfinder 10 relative to the camera 14 but have a height which avoids fouling with the base of the viewfinder 10 throughout the entire range of possible movement of the viewfinder 10.

Figure 3:
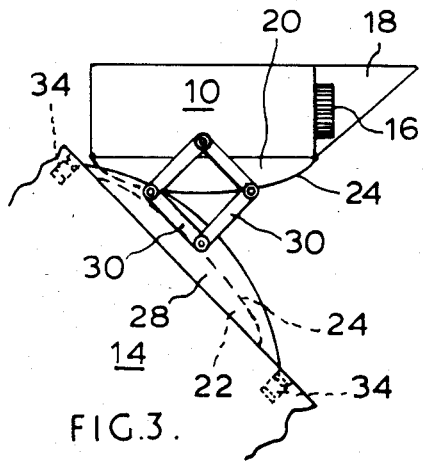
FIG. 3 shows a view, similar to FIG. 1, which is not in section and in which the camera is inclined at a relatively large angle.
Figure 5:
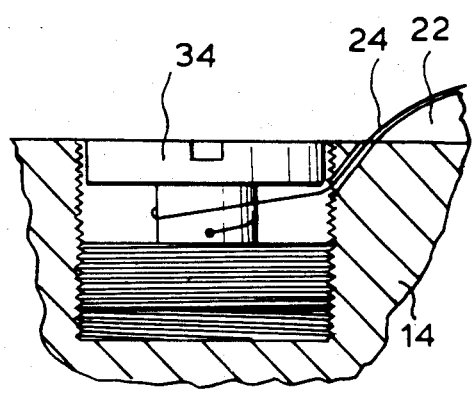
FIG. 5 shows a detailed view of a tension drum.
Figure 4:
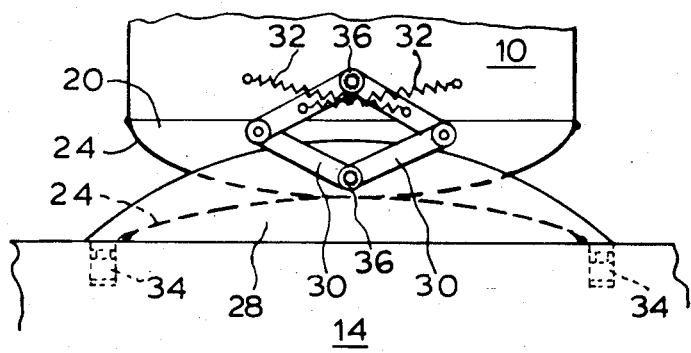
FIG. 4 shows the mounting arrangement to an enlarged scale, in comparison with FIGS. 1 to 3.

The relative position of the viewfinder 10 and camera 14 when the camera is inclined at a relatively large positive angle is illustrated in FIG. 3. In FIG. 3 the viewfinder 10 is substantially horizontal and this would be consistent with the camera being positioned five to six feet above the ground and in which the screen 16 is horizontally aligned with the operators normal head height. As the rolling pivot formed by the cables 24 nears the extremes of the mounting arrangement 12, the angle of tilt between the viewfinder 10 and the camera 14 increases. At such positions, the lateral restraint provided by the guides 28 is significantly reduced. More importantly, retention of the viewfinder 10 at such a large tilt to the camera 14 would be very unstable. Consequently, the mounting arrangement 12 includes a pair of pivotally connected struts 30; each strut of each pair also being pivotally retained on a respective side of the rocking motion. One pivotal connection is made to the viewfinder 10 and a further pivotal connection is made on the guide 28. It will be appreciated that when the tilt of the viewfinder 10 relative to the camera 14 is small, the pairs of struts 30 will form an oblate diamond shape, whereas when the tilt is large, the struts will form a prolate diamond shape. The pivotal connections to the viewfinder 10 and/or to the guides 28 are provided with respective friction disks 36 (as shown in FIG. 4). The friction disks 36 enable the ease with which the viewfinder 10 can be tilted to be adjusted and such adjustment also effects the stability of the viewfinder when at large angles to tilt with respect of the camera 14.

FIG. 4 shows the mounting arrangement 12 on an enlarged scale as compared with FIGS. 1 to 3. A further addition to the arrangement of struts is illustrated. This addition consists of springs 32 connected between the viewfinder 10 and a respective pair of struts 30. The ends of the springs 32 are attached on opposite sides of the pivotal connection of the struts to the viewfinder 10. The addition of the springs 32 provides increased stability for the viewfinder 10 when at large angles of tilt to the camera 14. The springs 32 are of particular benefit when the weight of the viewfinder 10 is relatively high.

The above-described mounting arrangement provides a number of advantages when compared with conventional mounting arrangements. A major advantage of the mounting arrangement of the present invention is that the center of gravity of the camera 14 and the viewfinder 10 is less drastically effected by movement of the viewfinder 10 than is the case with conventional mounting arrangements. This advantage is very significant in practice. The necessity of separate operating and carrying positions for the viewfinder 10 is eliminated. Additionally, tilting movement of the viewfinder 10 is found to be particularly smooth and avoids flatspots which are often encountered throughout the movement of conventionally mounted viewfinders.

Although a preferred embodiment of the invention has been described above, it will be evident to those skilled in the art that various modifications may be made without departing from the scope of this invention. The use of belts and the like in the place of cables is possible and the direct retention of the viewfinder 10 to the camera 14 by a single spring or the like is envisaged. Additionally, the use of a vertical stack of rockers is possible. Such an arrangement could, for example, be implemented by a stack of three elliptical bodies with the planes of the ellipses being in a common vertical plane.

I claim:

1. A mounting arrangement for adjustably attaching a viewfinder to a camera, comprising:
    at least one rocker, said at least one rocker having a first end, a second end and a curved surface extending therebetween, said curved surface interposed said viewfinder and said camera for a rocking motion therebetween;
    a second surface, positioned for rocking of said curved surface of said at least one rocker along said second surface, said second surface having a first end adjacent said first end of said at least one rocker, and a second end adjacent said second end of said at least one rocker; and
    means for attaching said at least one rocker to said second surface, said means for attaching comprising a first flexible elongated member having a pair of ends, one of said pair of ends secured to said second end of said second surface and an other of said pair of ends secured to said first end of said at least one rocker.

2. The mounting arrangement as claimed in claim 1, wherein said means for attaching further comprises a second flexible elongated member having a pair of ends, one of said pair of ends secured to said first end of said second surface, and an other of said pair of ends secured to said second end of said at least one rocker.

3. The mounting arrangement as claimed in claim 1, wherein said means for attaching further comprises means for adjusting the tension of said first flexible elongated member.

4. The mounting arrangement as claimed in claim 1, wherein said curved surface of said rocker forms part of a perimeter of an ellipse.

5. The mounting arrangement as claimed in claim 1, wherein said at least one rocker comprises a parallel pair of rockers.

6. The mounting arrangement as claimed in claim 1, comprising a pair of parallel guides for laterally restraining said parallel pair of rockers.

7. The mounting arrangement as claimed in claim 1, further comprising a first pair of pivotally connected struts, one strut of said first pair of pivotally connected struts being pivotally retained on said viewfinder and an other strut of said first pair of pivotally connected struts being pivotally retained on said camera.

8. The mounting arrangement as claimed in claim 7, further comprising a second pair of pivotally connected struts, one strut of said second pair of pivotally connected struts being pivotally retained on said viewfinder and an other strut of said second pair of pivotally connected struts being pivotally retained on said camera.

9. The mounting arrangement as claimed in claim 7, further comprising a friction disk mounted on said first pair of pivotally connected struts for regulating ease of pivoting.

10. The mounting arrangement as claimed in claim 7, further comprising at least one resilient element secured to one of said first pair of pivotally connecting struts and to said viewfinder so as to enhance stability of said viewfinder when positioned at or adjacent extremes of its motion.

11. A mounting arrangement for adjustably attaching a viewfinder to a camera, said mounting arrangement comprising:
a first surface located on said viewfinder;
a second surface located on said camera, one of said first surface and said second surface having a contoured shape to enable a rocking motion between said viewfinder and said camera; and
a flexible elongated member having a pair of ends, one of said pair of ends connected to said viewfinder and an opposite end of said pair of ends connected to said camera such that separation of said first and second surfaces is prevented.

12. The mounting arrangement as claimed in claim 11, further comprising:
means for tensioning said flexible elongated member, said means for tensioning positioned adjacent said second surface.

13. The mounting arrangement as claimed in claim 11, further comprising:
a pair of parallel guides mounted adjacent one of said surfaces for laterally restraining the other of said surfaces from lateral movement.

14. The mounting arrangement as claimed in claim 11, further comprising:
at least one pair of pivotally connected struts, one strut of said at least one pair of pivotally connected struts pivotally mounted on said viewfinder and an other of said at least one pair of pivotally connected struts being pivotally mounted on said camera; and
means for pivoting said at least one pair of pivotally connected struts such that said at least one pair of struts pivot during said rocking motion between said first and second surfaces.

15. The mounting arrangement as claimed in claim 14, further comprising:
a friction disk mounted to said means for pivoting for regulating the ease of pivoting.

16. The mounting arrangement as claimed in claim 15, wherein one of said surfaces is defined by a parallelly spaced-apart pair of surfaces.

17. The mounting arrangement as claimed in claim 16, wherein said parallelly spaced-apart pair of surfaces are defined to form part of the perimeter of an ellipse.

* * * * *

UNITED STATES PATENT AND TRADEMARK OFFICE
CERTIFICATE OF CORRECTION

PATENT NO. : 4,605,296
DATED : August 12, 1986
INVENTOR(S) : Derek Munnion

It is certified that error appears in the above-identified patent and that said Letters Patent is hereby corrected as shown below:

Column 2, line 56, delete "rocker" and insert ---- rockers ----.

Column 2, line 57, delete "rockers" and insert ---- rocker ----.

Column 2, line 60, delete "rocker 20" and insert ---- rockers 20 ----.

Same line, delete "rockers" and insert ---- rocker ----.

Signed and Sealed this

Twenty-fourth Day of March, 1987

Attest:

DONALD J. QUIGG

Attesting Officer

Commissioner of Patents and Trademarks